(12) United States Patent
Park et al.

(10) Patent No.: US 10,732,483 B2
(45) Date of Patent: Aug. 4, 2020

(54) NANOPHOTONIC RADIATOR USING GRID STRUCTURE FOR APPLICATION TO PHOTONIC PHASED-ARRAY ANTENNA

(71) Applicant: KOREA ADVANCED INSTITUTE OF SCIENCE AND TECHNOLOGY, Daejeon (KR)

(72) Inventors: Hyo Hoon Park, Daejeon (KR); Jong Hun Kim, Daejeon (KR); Sun Kyu Han, Daejeon (KR); Ji Hwan Park, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 0 days.

(21) Appl. No.: 15/777,074

(22) PCT Filed: Dec. 1, 2015

(86) PCT No.: PCT/KR2015/012953
§ 371 (c)(1),
(2) Date: May 17, 2018

(87) PCT Pub. No.: WO2017/086524
PCT Pub. Date: May 26, 2017

(65) Prior Publication Data
US 2018/0356705 A1    Dec. 13, 2018

(30) Foreign Application Priority Data

Nov. 17, 2015 (KR) .................. 10-2015-0160801
Nov. 30, 2015 (KR) .................. 10-2015-0168696

(51) Int. Cl.
*G02F 1/295* (2006.01)
*G02B 6/34* (2006.01)

(52) U.S. Cl.
CPC .............. *G02F 1/2955* (2013.01); *G02B 6/34* (2013.01)

(58) Field of Classification Search
CPC ....................................................... G02F 1/2955
See application file for complete search history.

(56) References Cited

U.S. PATENT DOCUMENTS

| 5,805,750 A * | 9/1998 | Bates ................ G02B 6/34 385/37 |
| 8,594,503 B2 * | 11/2013 | Roelkens ........... G02B 6/12007 385/15 |
| 8,699,837 B2 * | 4/2014 | Baets ................... G02B 6/125 385/37 |
| 9,915,787 B2 * | 3/2018 | Li ......................... G02B 6/34 |
| 2008/0012710 A1 | 1/2008 | Sadr |

(Continued)

FOREIGN PATENT DOCUMENTS

WO    2017082440 A1    5/2017

*Primary Examiner* — Michelle R Connelly

(57) ABSTRACT

A photonic radiator device forming a photonic phased array antenna includes a light waveguide including a waveguide clad and a waveguide core using a semiconductor material, and a grating periodically formed an upper or lower part of the light waveguide. The photonic radiator device receives an input light wave in a direction of the grating and the light waveguide and radiates an output light wave to a space by using scattering from the grating.

9 Claims, 16 Drawing Sheets

(56) References Cited

U.S. PATENT DOCUMENTS

| | | | |
|---|---|---|---|
| 2010/0187442 A1* | 7/2010 | Hochberg | G01S 7/4814 |
| | | | 250/492.1 |
| 2011/0187614 A1 | 8/2011 | Kirino et al. | |
| 2014/0023318 A1 | 1/2014 | Hulsey | |
| 2014/0161464 A1 | 6/2014 | Bowers et al. | |
| 2014/0192394 A1 | 7/2014 | Sun et al. | |
| 2015/0346340 A1* | 12/2015 | Yaacobi | G01S 17/36 |
| | | | 356/5.11 |
| 2016/0116680 A1* | 4/2016 | Ling | G02B 5/1809 |
| | | | 385/1 |
| 2016/0246009 A1* | 8/2016 | Jiang | G02B 6/124 |
| 2017/0299697 A1* | 10/2017 | Swanson | A61B 5/0066 |

\* cited by examiner (a)         (b)

(c)         (d)

| $\lambda_0$ | 1550nm |
|---|---|
| $W_g$ | 1μm |
| $\Lambda_h$ | $\Lambda_g/2$ |
| $N_g$ | 24 |
| $H_s$ | 90nm |
| $H_c$ | 250nm |

(a)

(b)

| $\lambda_0$ | 1550nm |
|---|---|
| $W_g$ | 1μm |
| $\Lambda_g$ | 620nm |
| $\Lambda_h$ | $\Lambda_g/2$ |
| $N_g$ | 24 |
| $H_s$ | 90nm |
| $H_c$ | 250nm |

| | |
|---|---|
| $\lambda_0$ | 1550nm |
| $W_g$ | 1μm |
| $\Lambda_g$ | 620nm |
| $\Lambda_h$ | $\Lambda_g/2$ |
| $H_s$ | 90nm |
| $H_c$ | 250nm |

| | |
|---|---|
| $\lambda_0$ | 1550nm |
| $W_g$ | 1μm |
| $\Lambda_g$ | 620nm |
| $\Lambda_h$ | 310nm |
| $L_g$ | 15μm |
| $H_s$ | 90nm |
| $H_c$ | 250nm |
| $D_r$ | 1.5μm |
| M | 8 |

NANOPHOTONIC RADIATOR USING GRID STRUCTURE FOR APPLICATION TO PHOTONIC PHASED-ARRAY ANTENNA

TECHNICAL FIELD

Embodiments of the inventive concept relate to a photonic radiator structure for application to a photonic phased array antenna and more particularly, relate to a photonic radiator array structure with a grating structure capable of radiating a light wave to a free space.

In detail, embodiments of the inventive concept propose structures capable of forming grating structures using a semiconductor material and widening scanning angles of light beams formed from a phased array. A detailed scale of a grating proposed herein is designed based on the concept of nanophotonics because it is close or smaller than a wavelength of the light wave.

BACKGROUND ART

A photonic phased array antenna may be used as a light source of scanning a photonic beam for image scanning in an autonomous car or robot. The photonic phased array antenna for application to various sectors is usually preferred to have the functionality of small size, high efficiency of photonic beam radiation, clear beam formation, and wide beam scanning range. For miniaturization of various requirements for the functionality, there is a need for a configuration of a photonic phased array antenna structure based on a semiconductor material. Further, since the efficiency of photonic beam radiation, visibility, and scanning functions are highly dependent on a structure of photonic radiator, it is required to propose a practical structure of photonic radiator based on a semiconductor material.

A semiconductor material includes a silicon or compound semiconductor, a metallic thin film material, and a dielectric material such as silicon nitride or silicon oxide which is used for manufacturing photonic devices made of the silicon or compound semiconductor.

A foregoing invention (US Patent Application No. 2014/0192394 A1) about a nanophotonics-based photonic phased array antenna has proposed a photonic phased array antenna where a phase-controlled photonic device is integrated in a form of M×M matrix based on a semiconductor silicon material.

In the foregoing invention, while the photonic radiator (corresponding to the antenna element in this specification thereof) is formed of a grating structure, photonic radiators are arranged in a form of matrix, and directional couplers and optical delay lines are arranged between unit photonic radiators. As such, because devices with different functions are crowded in one unit cell, a space occupied by a grating structure of the photonic radiator becomes smaller and thereby the dimension of gratings accommodated in such a small space should be scaled down in the dimension of several μm. Accordingly, if a scale of grating becomes smaller, it is difficult to obtain a high-performance beam because radiation efficiency of light wave is degraded.

A foregoing invention (PCT/KR2015/012199) made by the laboratory for the present application has proposed a phased array antenna capable of providing a photonic radiator part with a sufficient space as shown in FIG. 1. In FIG. 1, major elements forming the phased array antenna are roughly organized of a light source 100, photonic power distributors 101-1 and 101-2, phase controllers 102, and photonic radiators 104. Waveguides 106 are connected between the elements. Additionally, the waveguide 106 is also connected between the phase controllers 102 and the photonic radiators 104. Since high density of the waveguide could generate a coupling effect between the waveguides, their arrangement is important and for the reason, the waveguide is divided into phase-feeding lines 103.

The phased array of FIG. 1 is characterized, for the purpose of securing a sufficient space in a longitudinal direction of the photonic radiator 104, in that the power distributors 101-1 and 101-2, the phase controllers 102, and the phase-feeding lines 103 are arranged out of a 1×M radiator array 105. As such, the foregoing invention proposed that it is possible to secure a sufficient space between adjacent 1×M radiator arrays, as well as achieving a two-dimensional (2D) beam scanning function, by implementing a (1×M)×N phased array by independently arranging N-numbered 1×M radiator arrays up and down.

Accordingly, the following embodiments propose a photonic radiator structure which sufficiently uses a space in a longitudinal direction of a rating structure suitable for such a (1×M)×N phased array.

DETAILED DESCRIPTION OF THE INVENTION

Technical Problem

Embodiments of the inventive concept provide a photonic radiator for securing a proper level of light beam radiation and a performance of phase-matched beam by including a detailed grating structure.

Embodiments of the inventive concept further provide a photonic radiator for widening a range of a radiation angle of an output light wave, from a bilateral light wave input mode, and finally widening a scanning range of a phase-matched beam obtained through a phased array.

Technical Solution

According to an embodiment, a photonic radiator device forming a photonic phased array antenna includes a light waveguide including a waveguide clad and a waveguide core using a semiconductor material, and a grating periodically formed an upper or lower part of the light waveguide, wherein the photonic radiator device receives an input light wave in a direction of the grating and the light waveguide and radiates an output light wave to a space by using scattering from the grating.

The photonic radiator device may receive the input light wave in bilateral directions of the grating and the light waveguide, for widening a range of a longitudinal angle in that the output light wave is radiated, and radiate the output light wave to the space by using scattering from the grating.

At least one dimension of geometric parameters of the photonic radiator device—including a width of the waveguide core, a thickness of the waveguide core, a width of the grating, a period of the grating, and a depth of the grating—may have a value in a diffraction limit that is a half of a wavelength of the input light wave, or have a value close to the diffraction limit by a range that is set in advance.

The waveguide core may be formed of silicon.

A free space wavelength $\lambda_0$ of the input light wave may be ranged in 1 μm<$\lambda_0$<2 μm.

The width $W_g$ of the grating may be ranged in $0.3\lambda_0 \leq W_g \leq 5\lambda_0$ with respect to a free space wavelength $\lambda_0$ of the input light wave The depth of the grating may be adjusted to control a longitudinal distribution of the output light wave.

The period of the grating may be adjusted to control a longitudinal radiation angle of the output light wave.

The width of the grating may be adjusted to control a range of a transverse radiation angle in that the output light wave is radiated.

According to an embodiment, a photonic radiator array includes a light waveguide including a waveguide clad and a waveguide core using a semiconductor material, and a photonic radiator device including a grating in an upper or lower part of the light waveguide, receiving an input light wave in a direction of the grating and the light waveguide, and radiating an output light wave to a space by using scattering from the grating, wherein the photonic radiator array is implemented with an array of a plurality of photonic radiator devices, wherein the number of the plurality of the photonic radiator devices is adjusted to control a transverse radiation angle of a phase-matched beam that is formed through phase interference between output light waves radiated respectively from the plurality of photonic radiator devices, and wherein the number of periods of the grating included in each of the plurality of photonic radiator devices is adjusted to control the longitudinal radiation angle of the phase-matched beam that is formed through the phase interference between the output light waves radiated respectively from the plurality of photonic radiator devices.

According to an embodiment, a photonic radiator array includes a light waveguide including a waveguide clad and a waveguide core using a semiconductor material, and a photonic radiator device including a grating in an upper or lower part of the light waveguide, receiving an input light wave in a direction of the grating and the light waveguide, and radiating an output light wave to a space by using scattering from the grating, wherein the photonic phased array antenna is implemented with an array of a plurality of photonic radiator devices, and wherein the photonic phased array antenna provides a phase, which is increasing or decreasing such that the plurality of photonic radiator devices have a uniform phase difference, and to steer a phase-matched beam by a phased array of the plurality of photonic radiators to a transverse direction in the space.

Advantageous Effects of the Invention

According to embodiments of the inventive concept, it is possible to provide a photonic radiator for securing a proper level of light beam radiation and a performance of phase-matched beam by including a detailed grating structure.

Additionally, according to embodiments of the inventive concept, it is also possible to provide a photonic radiator for widening a range of a radiation angle of an output light wave, in a bilateral light wave input mode, and finally widening a scanning range of a phase-matched beam obtained from a phased array.

DESCRIPTION OF THE DRAWINGS

FIGS. 4A and 4B are diagrams showing an effect of grating periods to radiation angles in a single grating structure according to an embodiment of the inventive concept.

MODE OF THE INVENTION

Hereinafter, a grating-structured radiator according to embodiments of the inventive concept will be described below in conjunction with the accompanying drawings. These embodiments of the inventive concept are just described to show practical details without any intention for restricting and defining the scope of the inventive concept. All matters easily derivable from these embodiments of the inventive concept by those skilled in the art are construed as being included in the scope of the inventive concept.

Figure 2:
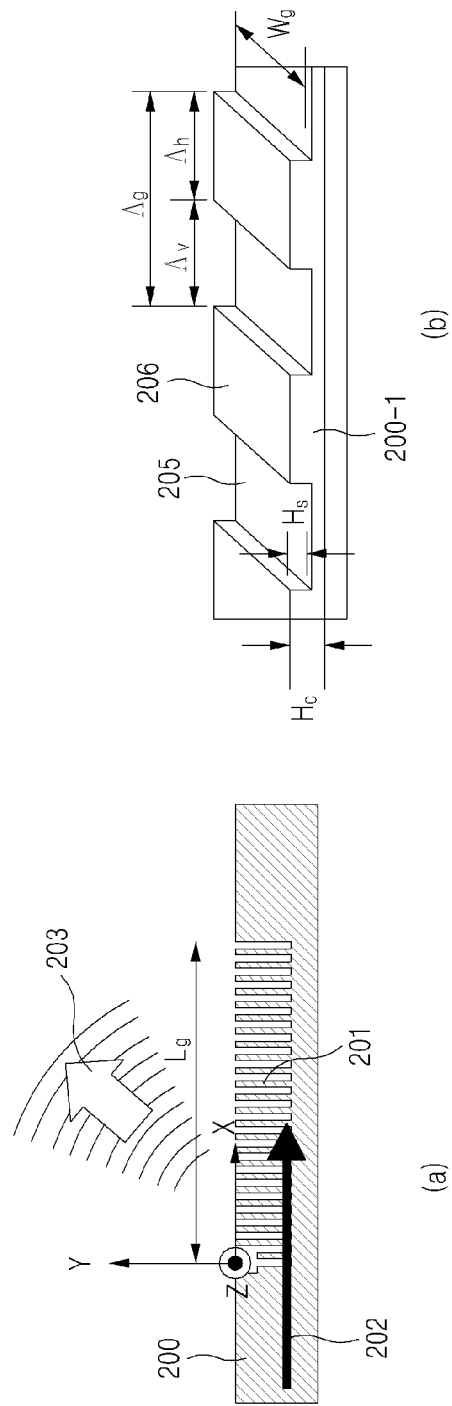
FIGS. 2A and 2B are schematic diagrams illustrating a basic structure of a photonic radiator according to an embodiment of the inventive concept.

FIGS. 2A and 2B are schematic diagrams illustrating a basic structure of a photonic radiator according to an embodiment. In detail, FIG. 2A is a side sectional diagram of a photonic radiator and FIG. 2B is a sectional diagram showing a structure of the photonic radiator.

Referring to FIGS. 2A and 2B, a grating structure may be generally placed at the end of a light waveguide core 200 and formed in higher and lower parts of the light waveguide core 200. The grating structure may not be restricted to the upper and lower parts of the light waveguide core 200 in location and may be formed even around the light waveguide core 200. A waveguide may be made of a general semiconductor or insulator material and may be fabricated in a rib or a channel-type structure. In this case, for the purpose of showing major design parameters, a channel-type light waveguide is exemplarily illustrated only with a core part of the waveguide and the grating is illustrated as being formed on the upper part of the light waveguide core 200.

If an input light wave 202 is incident through the light waveguide core 200, scattering may occur in the grating 201 and then an output light wave 203 may be radiated to an outer space in a diffraction pattern spread out over a relatively wide range thereof.

In this case, a wavelength of the input light wave 202 may be selected from wave bands with small optical loss in the light waveguide 200. For example, in the case that the light waveguide core 200 is made of silicon, a wavelength of the input light wave 202 may be preferred to be in a wavelength band of 1.1 μm~8.5 μm (wavelength in a free space).

The major design parameters (geometric parameters) of the photonic radiator may include a period $\Lambda_g$ of the grating 201, a width $\Lambda_v$ of a valley 205 of a unit grating, a width $\Lambda_h$ of a hill 206 of the unit grating, the number of periods $N_g$ of the grating, a length $L_g=\Lambda_g \times N_g$ of the grating, a depth $H_g$ of the grating (a depth of a valley of the grating), a thickness $H_c$ of a waveguide core 200-1 around the grating, a width $W_g$ of the grating of the waveguide core 200, and a pitch $D_r$ between unit radiators.

Embodiments of the inventive concept provide a particular grating structure which is obtainable with proper levels of light wave radiation efficiency, a range of a radiation angle, a pattern of phase-matched beam formed by a phased array, and a range of a scanning angle.

Additionally, while FIG. 2A illustrates that the input light wave 202 is incident only in a unilateral direction (form the left to the right), an incident direction may not be restricted thereto. As an alternative for further widening a scanning angle range, it may be permissible to propose an antenna structure where an input light wave is bilaterally incident on the grating. This will be described later in detail with reference to FIG. 9.

A radiation angle of a far-field of the output light wave 203 radiated from the grating structure may be designed by using Equation 1 in the mechanism of diffraction principle.

$$\Lambda_0/\Lambda_g = n_{eff} - n_c \sin\theta \quad \text{[Equation 1]}$$

In Equation 1, $\Lambda_0$ denotes a centroid wavelength of the input light wave 202 in a free space, $\Lambda_g$ denotes a period of the grating, $n_{eff}$ denotes an effective refractive index of the light waveguide including the grating (an effective refractive index of the whole waveguide including a clad), $n_c$ denotes a refractive index of the clad covering the light waveguide core where the grating is formed, and $\theta$ denotes a radiation angle corresponding to a center (e.g., an angle from a normal direction of a grating surface) at which the maximum light intensity appears in a diffraction pattern which is formed through diffraction of a light wave scattered from the grating 201 which is periodical.

In this case, the effective refractive index $n_{eff}$ may be determined depending on a structure of the light waveguide based on a refractive index according to a material of the light waveguide and a wavelength of a light wave. Additionally, a refractive index of the clad may be expressed in $n_c=1$ in the case that the grating is exposed to a free space. This equation is based on a classical diffraction theory, but such a classical diffraction theory has a problem in properly representing the case that geometric dimensions such as a period of the grating, and a width and a thickness of the light waveguide core are equal to or smaller than a diffraction limit, that is, the case that the geometric dimensions are close to or smaller than a half wavelength ($\lambda_0/2$) of the input light wave 202. Accordingly, for embodiments of the inventive concept, it is possible to generally interpret radiation characteristics of a beam through a numerical simulation in a small-scale region included in a nanophotonics area.

Figure 3:
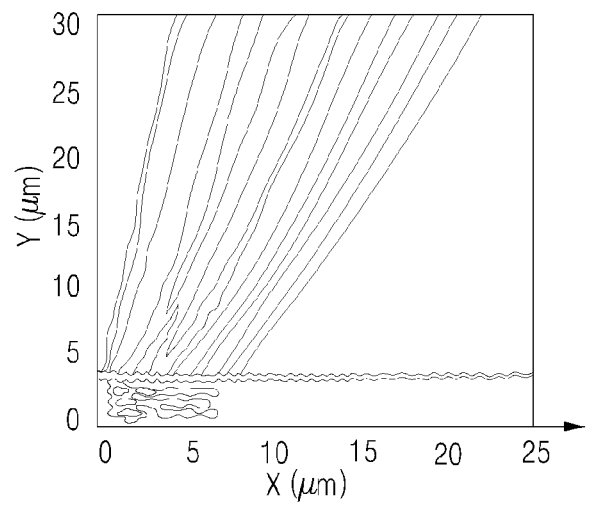
FIGS. 3A to 3D are diagrams showing diffraction patterns radiated from a single grating structure according to an embodiment of the inventive concept.
Figure 3:
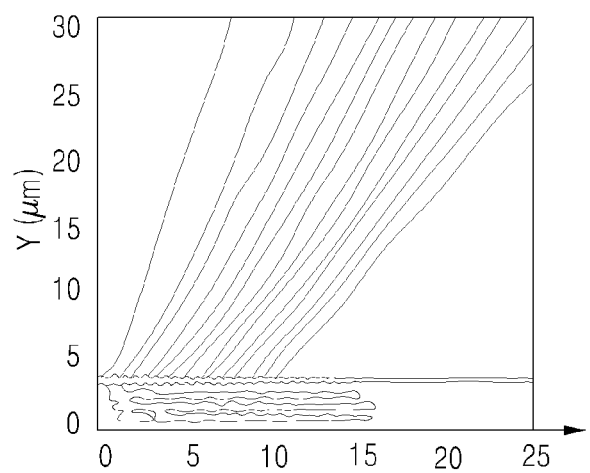

FIGS. 3A to 3D are diagrams showing diffraction patterns radiated from a single grating structure according to an embodiment of the inventive concept. In detail, FIGS. 3A and 3C show design parameters for two types of grating structures which have different depths of grating valleys, and FIGS. 3B and 3D show simulation results of near field patterns radiated from their corresponding grating structures (e.g., FIGS. 3B and 3D show radiation characteristics of simulations that are performed with Finite-Difference Time-Domains (FDTD) for their corresponding gratings). That is to say, FIGS. 3A to 3D show examples of effects by major parameters capable of controlling a distribution of an output light wave radiated in a longitudinal direction that is a lengthwise direction of the grating.

The radiation characteristics of FIGS. 3B and 3D exhibit near fields of electric fields for light waves on a longitudinal section of the grating (on the X-Y plane of FIG. 2A), showing the field intensities in colors. As shown in FIGS. 3B and 3D, the fields are divided into different segments along a longitudinal direction, which is caused by differences between scattering rates thereof due to unevenness of the grating. The overall intensity of the fields may be weakened along the lengthwise direction of the grating.

While FIG. 3B shows a result that a field is radiated from the front part within 5 μm ($N_g$=8) in the whole length 15 μm (grating period $N_g$=24) of the grating, FIG. 3D shows another result that a considerable amount of a field is spread out to the rear part of the grating. This difference is raised from a difference between valley depths $H_s$ of the gratings. In other words, if a valley depth of the grating is deep, a radiated field may be concentrated on the front part of the grating due to a larger scattering effect. If a valley depth of the grating is shallow, a radiated field to the rear part of the grating may be dispersed a smaller scattering effect.

In this case, since the whole radiation efficiency is degraded if the field is concentrated on the front part of the grating, it is preferred to extend a scattering up to a sufficient range in a longitudinal direction of the grating as shown in FIG. 3D in order to raise the whole radiation efficiency.

A longitudinal distribution of a radiation field may be affected mainly from a valley depth of the grating, but also affected from a wavelength of a light wave, a thickness of the light waveguide core, and a width of the grating. Considering the effect of the parameters, in scales close to values of the parameters exemplified by FIGS. 3A and 3C, roughly, a portion equal to or larger than 80% of an electric field of an output light wave may be radiated to a space within 8 periods of the grating in the case that a relative ratio of a valley depth of the grating to a thickness of the light waveguide core is equal to or higher than ¼. On the other hand, a portion equal to or larger than 80% of the electric field of the output light wave may be radiated to a space until a range equal to or larger than 5 or 8 periods of the grating in the case that a relative ratio of a valley depth of the grating to a thickness of the light waveguide core is equal to or lower than ¼.

FIGS. 4A and 4B are diagrams showing an effect of grating periods to radiation angles in a single grating structure according to an embodiment. In detail, FIG. 4A shows values of design parameters, and FIG. 4B shows simulation results for variation of a longitudinal radiation angle (corresponding to θ) of a far field depending on variation of a period $\Lambda_g$ of the grating in the condition that the design parameters of FIG. 4A are fixed.

Referring to FIGS. 4A and 4B, it can be seen from FIG. 4B that a radiation angle may be variable in a wide range with small variation of the grating period $\Lambda_g$. Additionally, in a structure with the parameters of FIG. 4A, an effective refractive index $n_{eff}$ is about 2.8 and is not affected greatly from a period of the grating. In this case, the effective refractive index is sensitive to a width $W_g$ of the light waveguide core where the grating is formed. For the structure of FIG. 4A, in the case that a refractive index of a semiconductor material of the light waveguide core is 3.5 and a width of the light waveguide core is ranged in $0.3\lambda_0 \leq W_g \leq 5\lambda_0$, an effective refractive index of the light waveguide where the grating is formed may be ranged in $2.5 < n_{eff} < 3.0$.

Referring to Equation 1, a radiation angle θ tends to be determined by a relative difference between an effective refractive index $n_{eff}$ and a relative ratio $\lambda_0/\Lambda_g$ which is a ratio of a wavelength of a free space to a period of the grating. In regard to this tendency, when the $\lambda_0/\Lambda_g$ roughly varies in a value of $n_{eff} \geq \lambda_0/\Lambda_g \geq 0.6\ n_{eff}$ in scales close to values of the parameters exemplified in FIG. 4A, a longitudinal radiation angle range may vary in 0°~60°. It is possible to reduce the ratio $\lambda_0/\Lambda_g$ narrower than the range to enlarge the longitudinal radiation angel range to a value equal to or larger than 60°, but it degrades radiation efficiency and then decreases usability thereof.

Now, parameters affecting a transverse radiation range of a single radiator will be described hereinbelow. Based on the classical Gaussian beam radiation theory, a transverse angle range $2\phi_r$ of a light wave radiated from a single radiator may be given by Equation 2.

$$2\Phi_r = \frac{2\lambda_0}{\pi W_g} \quad \text{[Equation 2]}$$

In Equation 2, $W_g$, as a parameter corresponding to a size of an opening which is a starting point of the Gaussian beam radiation, may be a width $W_g$ of the grating in the grating-structured photonic radiator.

According to the basic expression of Equation 2, a transverse range of a far field radiated from a single grating structure may be principally determined by a relative ratio of a wavelength to a width of the grating, that is, $\lambda_0/W_g$, and may be widened as a relative width of the grating becomes narrower. Equation 2 simply represents only a general relation of the parameters and a radiation range of a structure according to an embodiment, as a nanophotonics area, will be confirmed by a simulation of numerical analysis as shown in FIGS. 5A to 5C.

Figures 4, 5A:
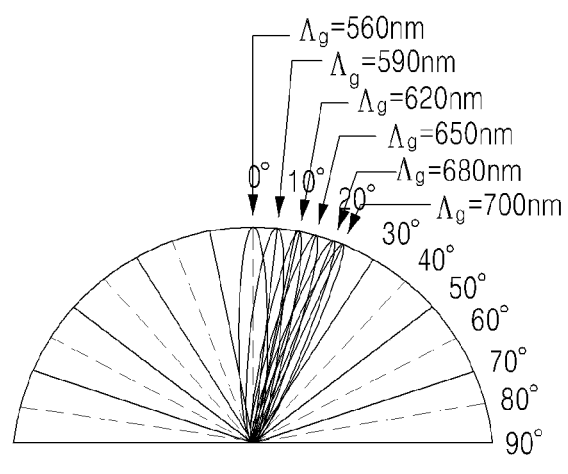
FIGS. 5A to 5C are diagrams showing a range of a far-field pattern radiated from a single grating structure according to an embodiment of the inventive concept.
Figure 5B:
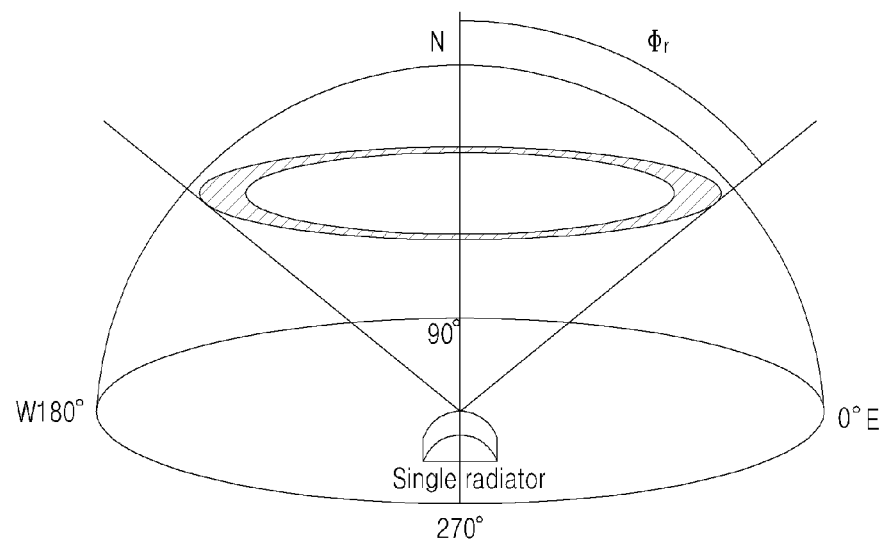
Figure 5C:
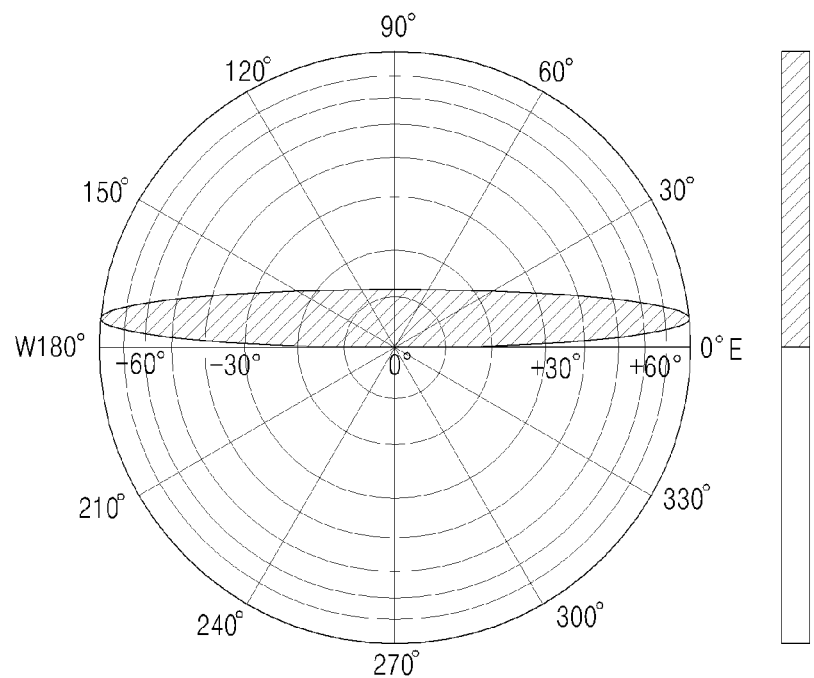

FIGS. 5A to 5C are diagrams showing a range of a far field radiated from a single grating structure according to an embodiment. In detail, FIG. 5A shows design parameters, FIG. 5B shows a 3D view of a hemispherical spatial coordinate system and FIG. 5C shows a simulation result which represents a radiation range as a planar projection model in the hemispherical spatial coordinate system.

Referring to FIGS. 5A to 5C, a structure applied to FIGS. 5A to 5C is a case of designing a transverse range wider and major design parameters including $W_g$ are the same with FIG. 4A. But, a period of the grating is selected as $\Lambda_g$=620 nm in which a radiation angle is θ=10.4°. In the structure of FIG. 5A, a major parameter determining a transverse range is $\lambda_0/W_g$=3.1. In FIGS. 5B and 5C, a direction of W(180°)-E(0°) corresponds to a transverse direction of the grating (the direction "Z" in FIG. 2A) and the direction "N" corresponds to a normal direction of the grating (the direction "Y" of FIG. 2A, θ=0° in Equation 1). In the exemplary structure of FIG. 5B, since the radiation angle is θ=10.4°, the radiation pattern of FIG. 5C is slightly leaned toward 90° more than toward the line of) W(180°)-E(0°). An electric field radiated from the grating is distributed similar to a cone having an oval section as shown in FIG. 5B, and radiated wider along the transverse direction (the direction of W(180°)-E(0°)) than the longitudinal direction (the direction of 90°-270°) as shown in FIG. 5C. With respect to a distribution of light intensity in a direction of W-N-E in FIG. 5B, the light intensity is maximized in the vertical direction (the direction "N") and exceeds a radiation angle $\phi_r$ until a range in which the light intensity falls down to $1/e^2$ of the maximum intensity (1/e of the maximum electric field; in this case, the exponent is e≈2.72). This result means that it is possible to widen the maximum beam steering range near to ±45° in the transverse direction in the case of forming a phased array with a grating structure ($\lambda_0/W_g$=3.1) according to an embodiment of the inventive concept.

Next, parameters affecting performance of a phase-matched beam in the case of forming an array with the photonic radiator will be described hereinbelow. In a 1×M radiator array, one or more phase-matched beams may be formed due to interference between output light waves radiated respectively from photonic radiators of the 1×M radiator array. A transverse radiation angle $2\eta_{//}$ of the phase-matched beam may be given by Equation 3 based on the classical Gaussian beam radiation theory.

$$2\eta_{//} = \frac{2\lambda_0}{\pi(W_g \cdot M)} \quad \text{[Equation 3]}$$

In Equation 3, $W_g \cdot M$ is a parameter determined under assumption that a size of an opening as the starting point of the Gaussian beam radiation is the width of the whole array. According to the basic expression of Equation 3, major parameters affecting a transverse radiation angle of a phase-matched beam are a relative ratio $\lambda_0/W_g$ of a wavelength to a width of the grating, and the number "M" of radiators of the array. Especially, as the number "M" of the radiators increases, Equation 3 goes to result in narrowing a transverse radiation angle $2\eta_{//}$ of the phase-matched beam. Equation 3 simply represents only a general relation of the parameters and a further detailed form will be confirmed by a simulation of numerical analysis as shown in FIGS. 6A to 6E.

FIGS. 6A to 6E shows a detailed result about an effect of the number "M" of the radiators, which form a 1×M radiator array, against a behavior of a phase-matched beam in the case of forming the 1×M radiator array in a grating structure according to an embodiment. In other words, FIGS. 6A to 6E show simulation results for patterns of phase-matched beam radiated from a phased array in the case of forming the phased array of 1×M array in a grating structure according to an embodiment and fixing a phase difference between radiators to Δϕ=0°.

Figures 6A, 6B:
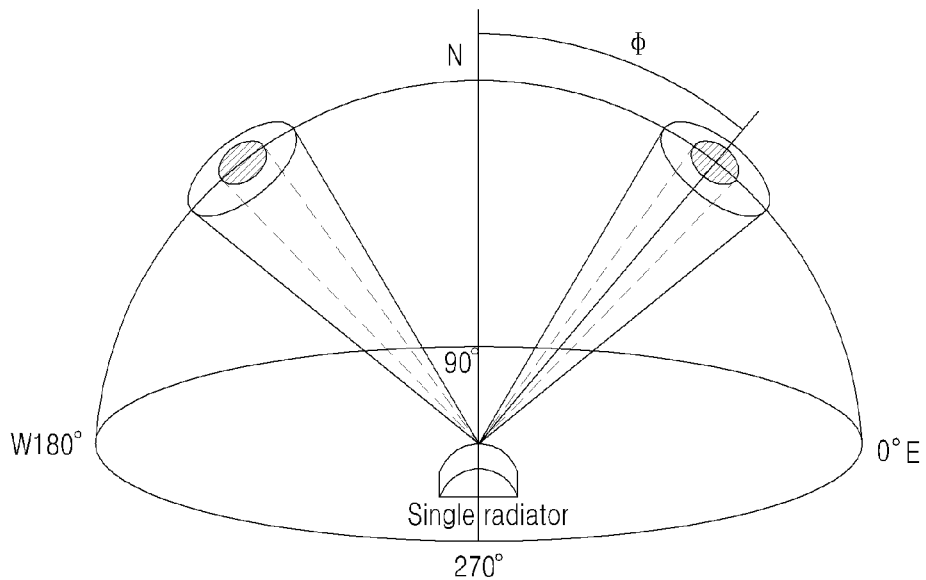
FIGS. 6A to 6E are diagrams showing a pattern of a phase-matched beam radiated from a grating-structured radiator array according to an embodiment of the inventive concept.
Figure 6C:
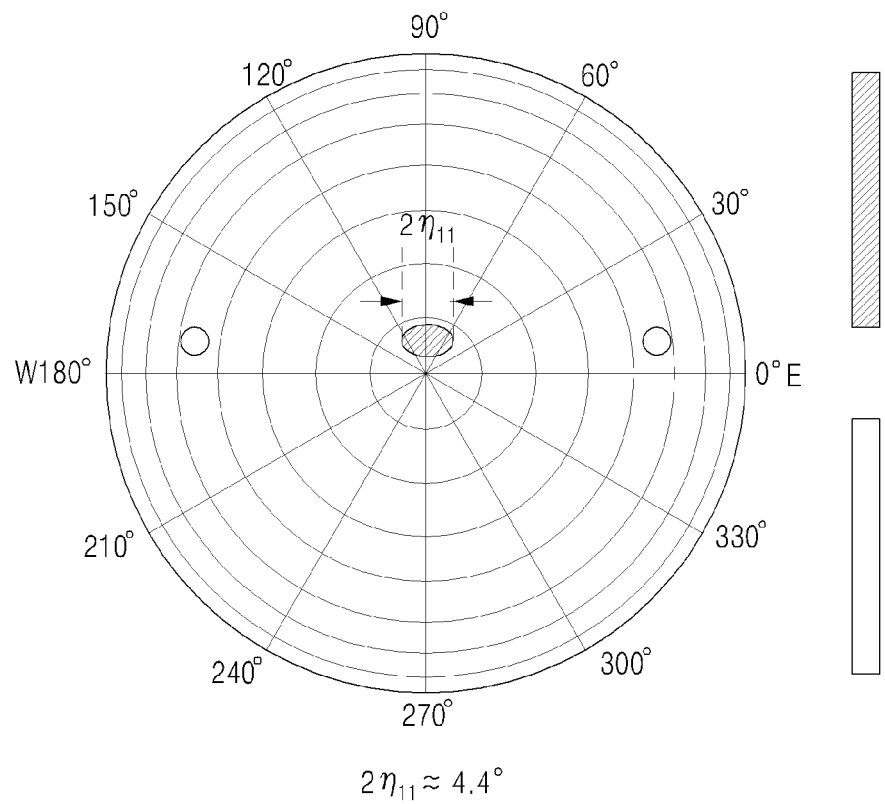
Figure 6D:
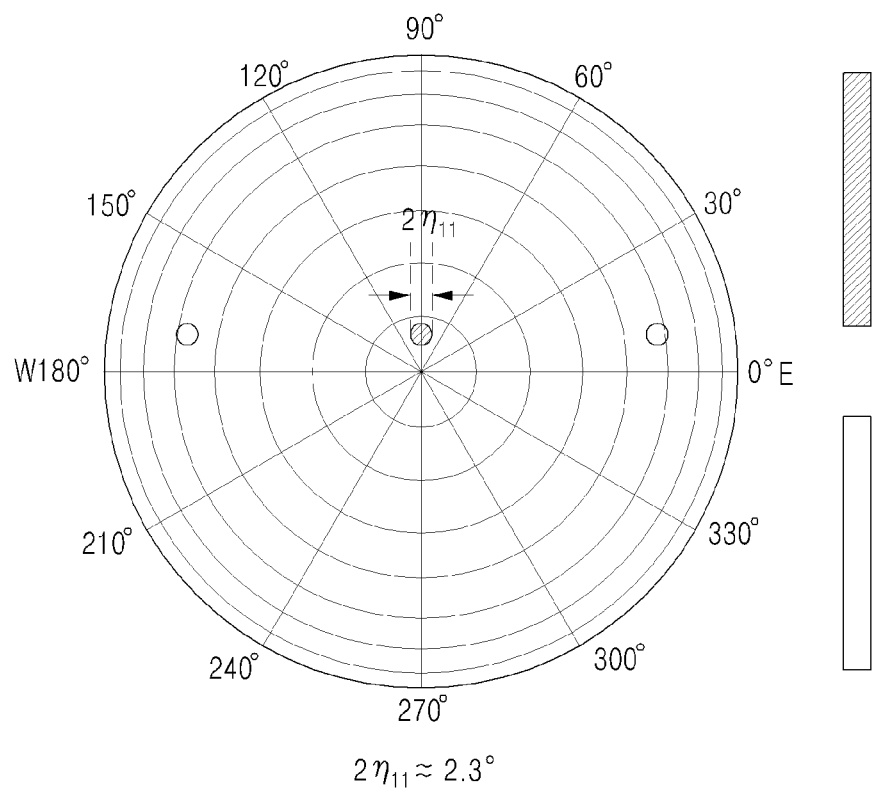
Figure 6E:
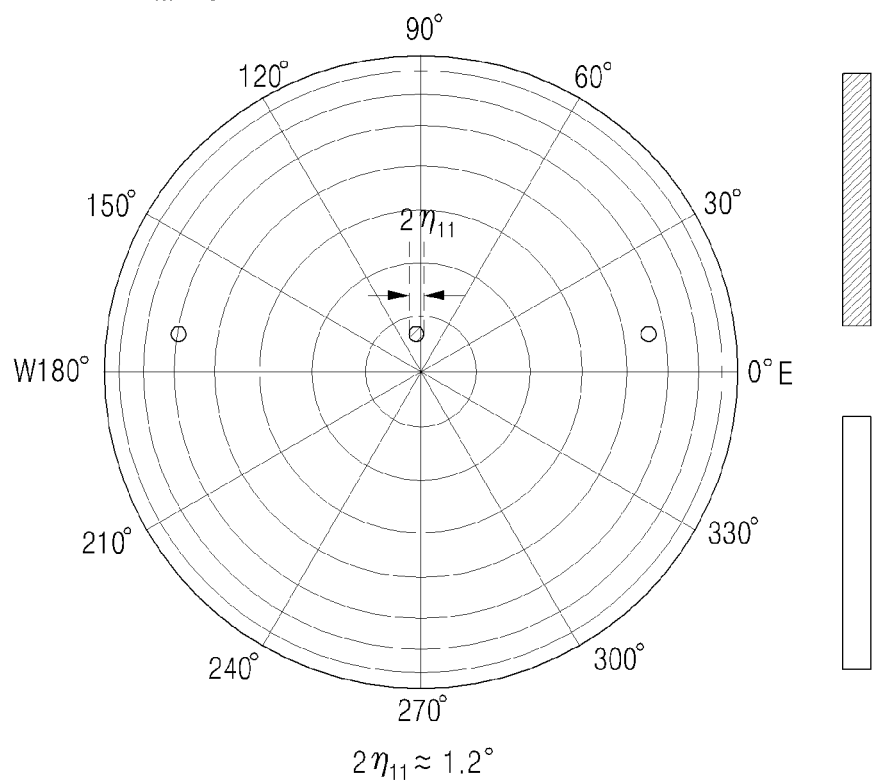

In detail, FIG. 6A shows values of design parameters, FIG. 6B is a schematic diagram illustrating a beam radiation pattern in a spatial coordinate system, and FIGS. 6C to 6E show simulation results for variation of a phase-matched beam pattern according to the number "M" of the radiators in the array.

Referring to FIGS. 6A to 6E, the radiator's design parameters exemplified in FIG. 6A are the same as the unit design parameters exemplified in FIG. 5A. Especially, the parameter $\lambda_0/W_g$ is the same as that of FIG. 5A, and the number of gratings is exemplified as $N_g$=24. From FIGS. 6C to 6E, it can be seen that as the number "M" of the radiators increases to 8, 16, and 32, a transverse radiation angle $\eta_{//}$ of a phase-matched beam becomes narrower to 4.4°, 2.3°, and 1.2°. According to a result of simulation result using the aforementioned the condition, it is possible to further narrow a transverse radiation angle $\eta_{//}$ equal to or smaller than 0.8° in the case that the number "M" is equal to or larger than 64.

Figure 7A:
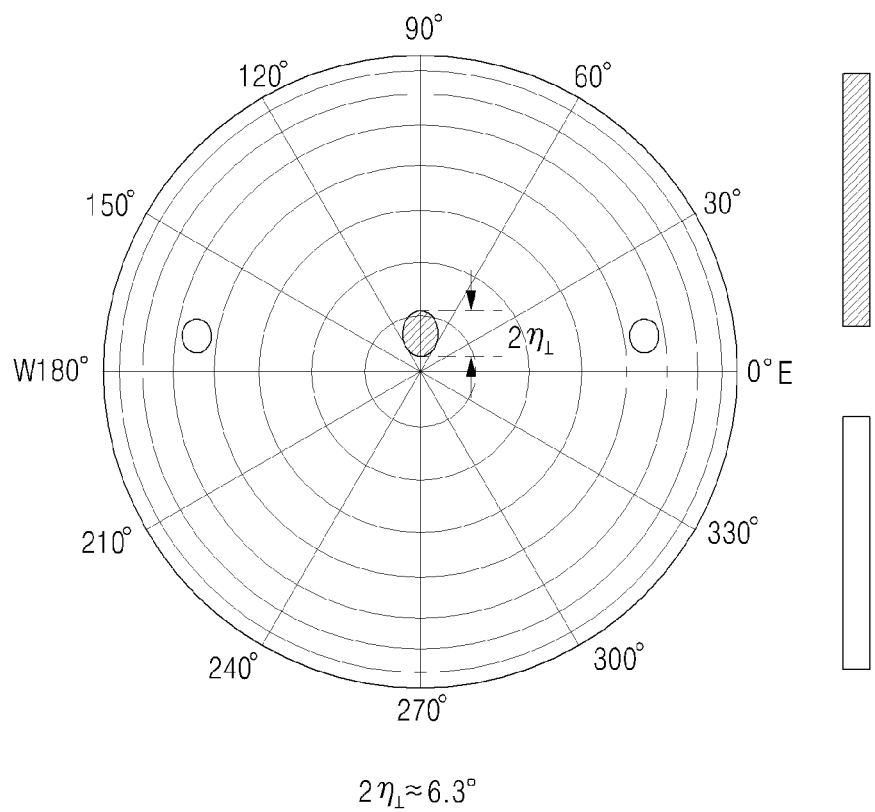
FIGS. 7A to 7C are simulation results showing variation of a phase-matched beam by variation of the number of grating periods, $N_g$, in a radiator of a grating-structured radiator array according to an embodiment of the inventive concept.
Figure 7B:
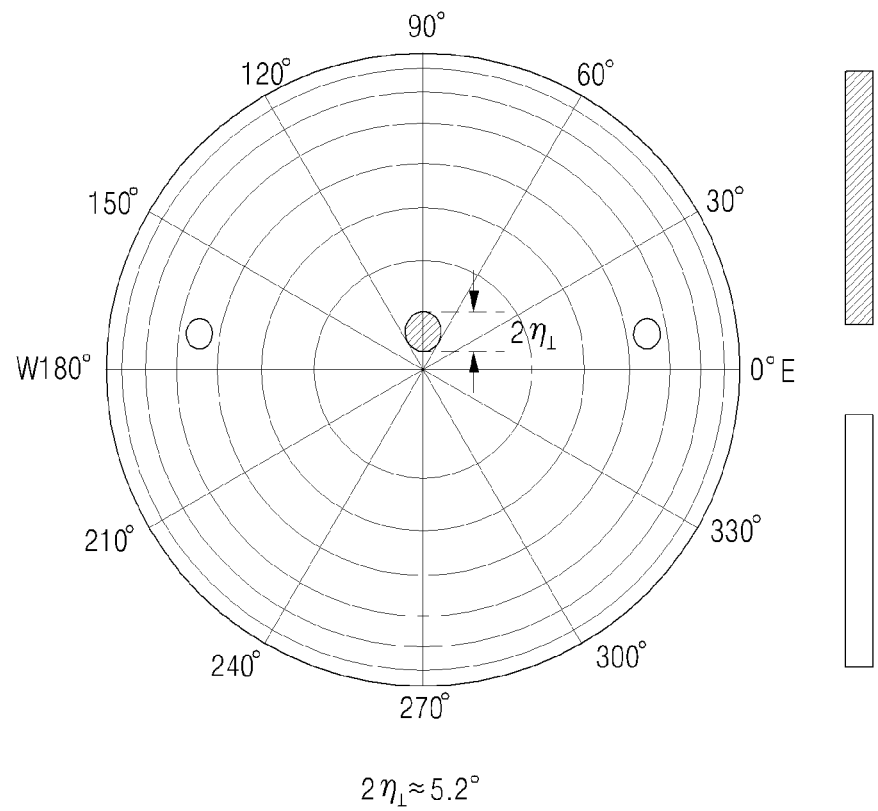
Figures 7C, 8A:
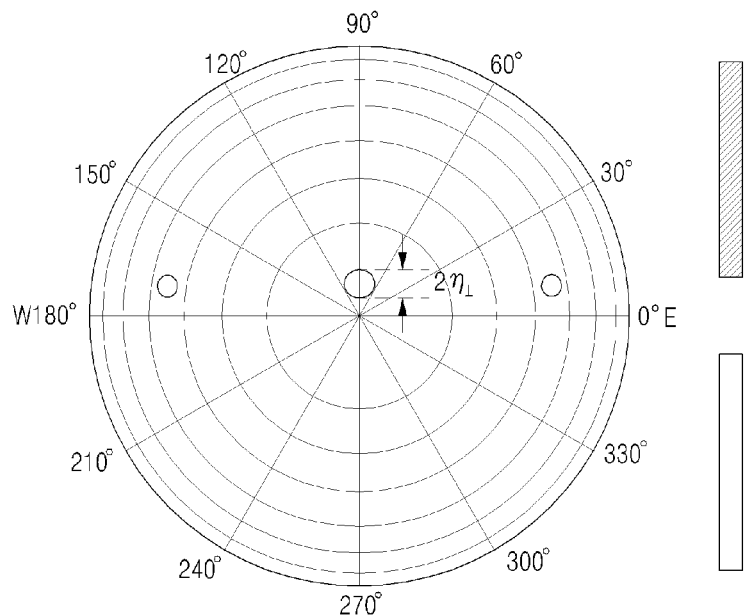
FIGS. 8A to 8E are diagrams showing results of a steering function of a phase matched beam by phase control in a grating-structured phased array according to an embodiment of the inventive concept.

Hereupon, the narrowing of a beam radiation angle means that it is permissible to improve resolution during an image scanning. Accordingly, adjusting transverse resolution may be performed with the number "M" of the radiators. For this operation, adjusting a longitudinal radiation angle of a phase-matched beam, that is, adjusting longitudinal resolution, may be performed with $L_g$, which is a length of the grating of the array, as shown in FIGS. 7A to 7C.

Next, parameters affecting a longitudinal radiation angle of a phase-matched beam, in the case of forming an array with the radiators, will be described hereinbelow. A longitudinal radiation angle $2\eta_\perp$ of a phase-matched beam may be given by Equation 4 based on the classical Gaussian beam radiation theory.

$$2\eta_\perp = \frac{2\lambda_0}{\pi L_g} = \frac{2\lambda_0}{\pi (N_g \cdot \Lambda_g)} \quad \text{[Equation 4]}$$

Equation 4 is similar to Equation 2 and is derived from the assumption that a longitudinal radiation angle of a phase-matched beam is determined by a longitudinal size of an opening as the starting point of the Gaussian beam radiation, that is, $L_g$. According to Equation 4, a transverse range of a far field radiated from a single grating structure may be determined by a ratio of a wavelength to a width of the grating, that is, $\lambda_0/L_g$, and a longitudinal radiation angle $2\eta_\perp$ may be narrower as the relative ratio $\lambda_0/L_g$ becomes smaller. A length of the grating is given in $L_g=N_g\cdot\Lambda$. Accordingly, the transverse resolution may be adjusted by a length of the grating, $L_g$ (or $N_g$). Equation 4 simply represents only a general relation of the parameters and a radiation range of a structure corresponding to a nanophotonics area according to an embodiment of the inventive concept will be confirmed by a simulation of numerical analysis as shown in FIGS. 7A to 7C.

FIGS. 7A to 7C show simulation results about variation of a longitudinal radiation angle, $2\eta_\perp$, of a phase-matched beam according to variation of the number $N_g$ of grating periods in a grating-structured radiator array. Major design parameters applied to FIG. 7A are the same with the design parameters of FIG. 6A, and the number of radiators of a photonic radiator array is exemplified in M=8. From an example shown in FIGS. 7A to 7C, it can be seen that a longitudinal radiation angle $2\eta_\perp$ becomes narrower to 6.3°, 5.2°, and 3.3° as the number of grating periods, $N_g$, becomes larger to 16, 20, and 24 (as a length $L_g$ becomes longer), respectively, and longitudinal resolution can be improved thereby.

Figure 8B:
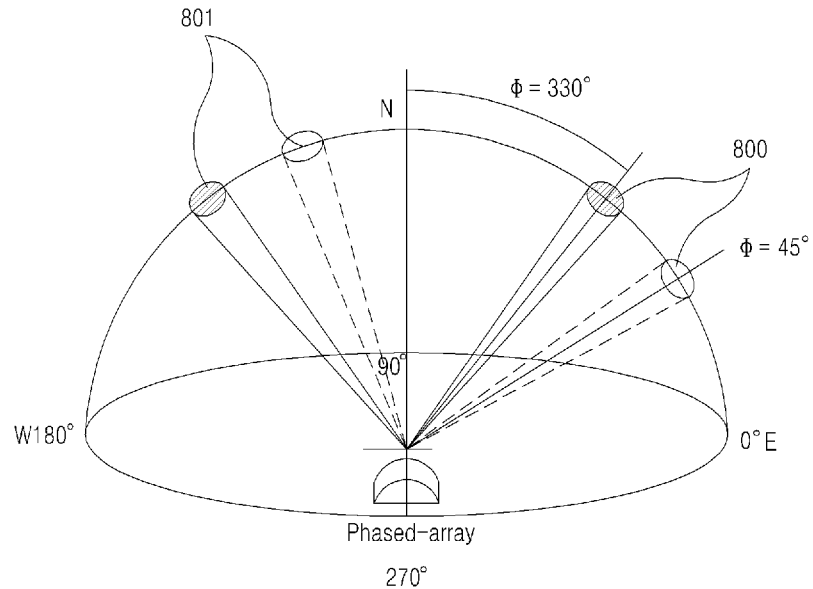
Figure 8C:
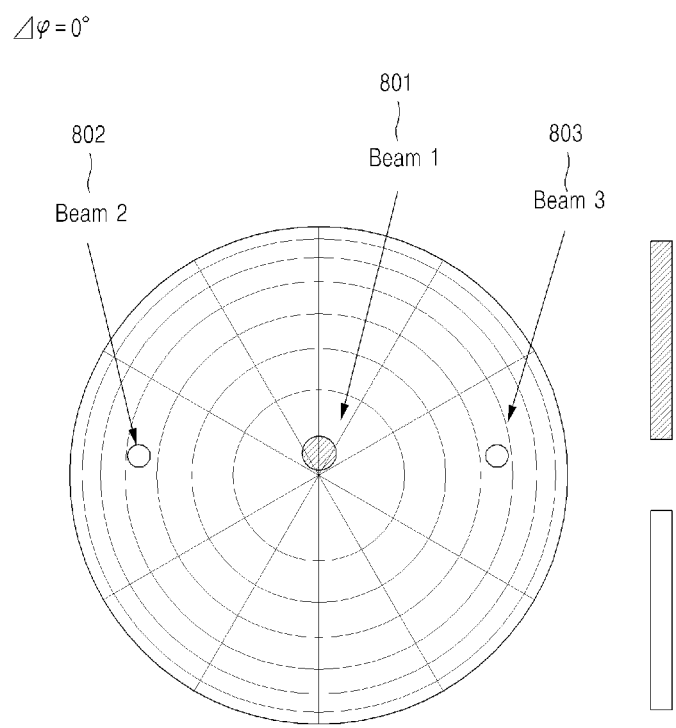
Figure 8D:
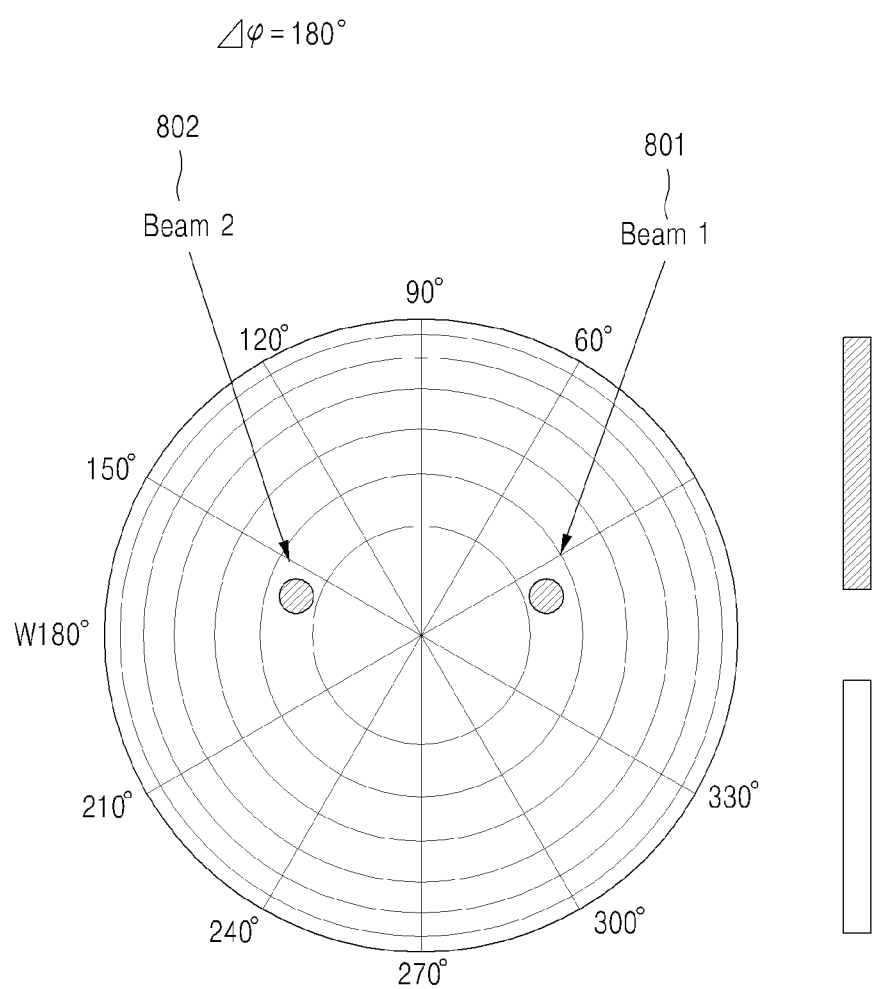
Figure 8E:
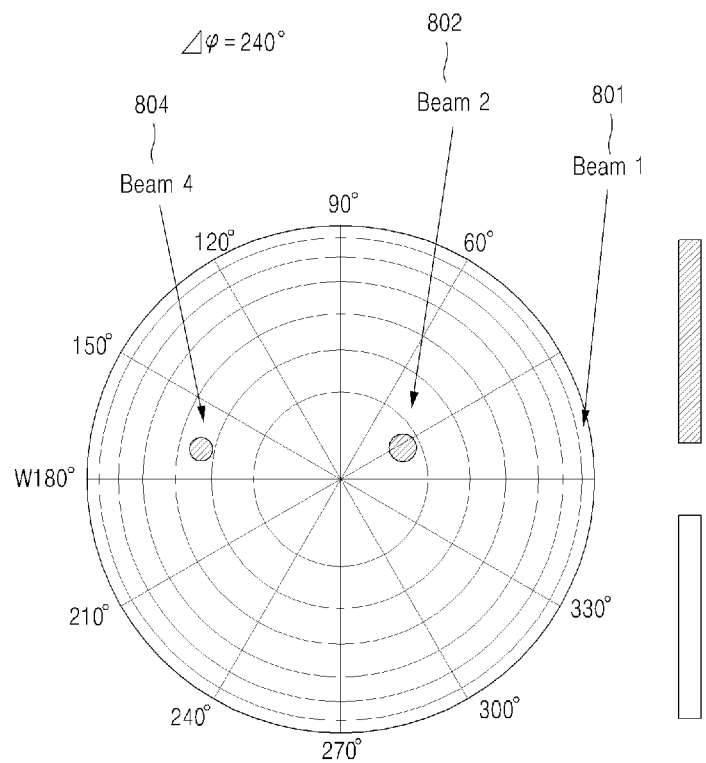

FIGS. 8A to 8E are diagrams showing a steering function of a phase—matched beam by phase control in a grating-structured phased array according to an embodiment. In detail, FIG. 8A shows values of design parameters, FIG. 8B is a schematic diagram illustrating a beam steering feature in a hemispherical spatial coordinate system, and FIGS. 8C to 8E show simulation results showing a result of steering phase-matched beams.

In the case that a phase difference is $\Delta\phi=0°$, as shown in FIG. 8C, a phase-matched beam 1 (801) with strong light intensity is formed close to the center, that is, close to the direction "N". In the example of FIG. 8C, two of a phase-matched beam 2 (802) and a phase-matched beam 3 (803), with weak light intensity, are formed at both outer sides close to the directions "W" and "E". As can be seen from comparison between FIGS. 8C and 8D, if a phase difference is enlarged from 0° to 180°, the beam 1 (801) moves to the direction "E" and the beam 2 (802) moves to the center (the direction "N") from the direction "W". During this move, light intensity of the beam 1 (801) becomes gradually weaker and light intensity of the beam 2 (802) at the direction "W" becomes gradually stronger. As shown in FIG. 8E, if a phase difference goes to be equal to or larger than 180°, the beam 1 (801) and the beam 2 (802) further move toward the direction "E" and the most portion of a field transitions to the beam 2 (802). Additionally, a beam 4 (804) newly appears at the direction "W". As aforementioned, several beams may be steered during a phase modulation process and transitions of light wave field between the beams may vary light intensity. Among such several beams, the beam with the strongest light intensity is defined as a $0^{th}$-order beam and other outer beams are defined as high-order beams.

From the results shown in FIGS. 8A to 8E, as shown in FIG. 8B, in the case of varying a phase difference in a range of $0\le\Delta\phi\le2\pi$ and using all of the $0^{th}$-order beam and the high-order beam in a phased array structure according to an embodiment of the inventive concept, the maximum transverse range $\phi_s$ may exceed ±45°. In this case, if a steering angle becomes much larger, it may cause a field of the high-order beam to be much weaker. Accordingly, for the purpose of maintaining intensity of light beams on an appropriate level, it is preferred to vary a phase difference in a range $-\phi\le\Delta\phi\le+\pi$ and to use only the $0^{th}$-order beam. According to this manner, the maximum transverse range of the beam steering, $\phi_s'$, is scaled down to a half of the maximum transverse range of the aforementioned manner, $\phi_s$, that is $\phi_s'=\phi_s/2$. The aforementioned manner varies a phase in a range $0\le\Delta\phi\le2\pi$ and uses the $0^{th}$-order beam and high-order beam.

Figure 9:
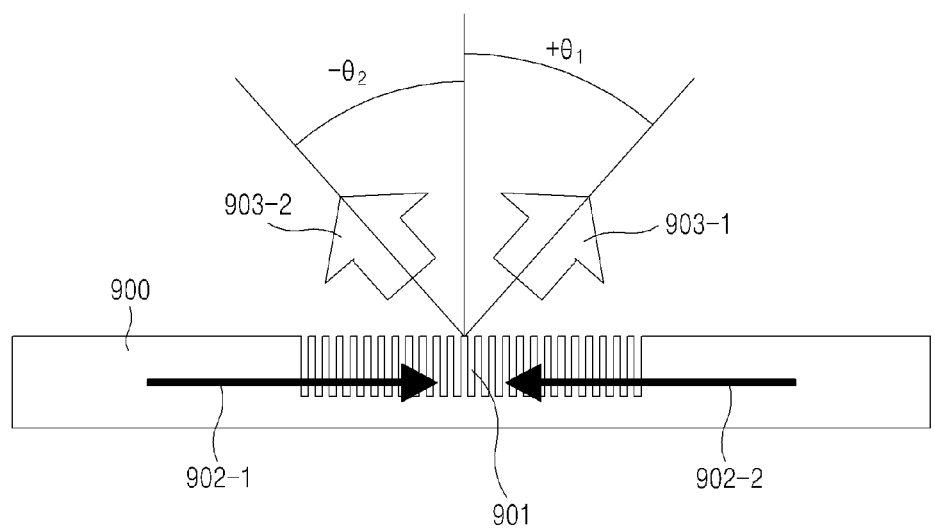
FIG. 9 is a schematic diagram illustrating longitudinal extension of an output light wave radiated from bilateral incidence in a grating structure according to an embodiment of the inventive concept.

FIG. 9 is a schematic diagram illustrating longitudinal extension of an output light wave radiated from bilateral incidence in a grating structure according to an embodiment.

Figure 1:
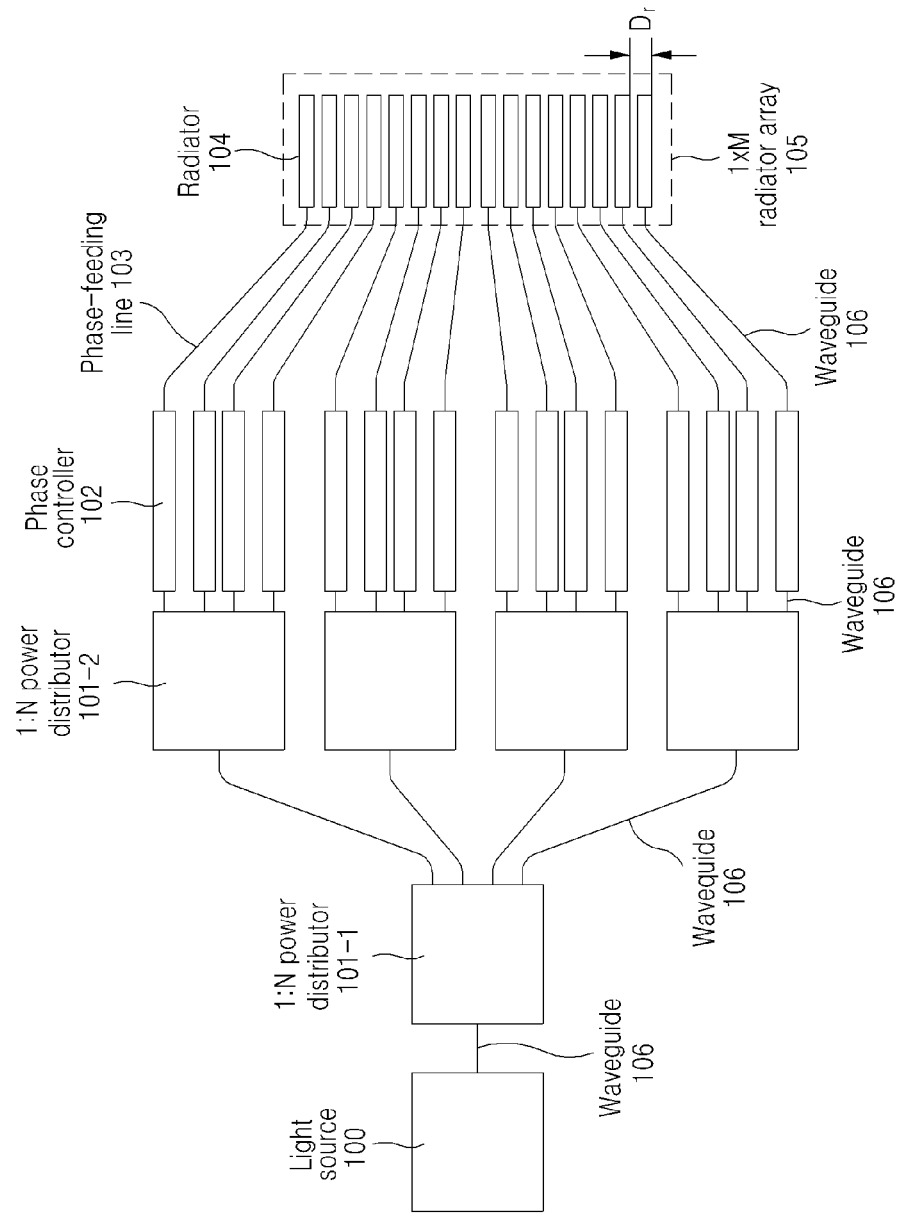
FIG. 1 is a schematic diagram illustrating major elements of a photonic phased array antenna proposed by a forgoing invention.
Figure 10:
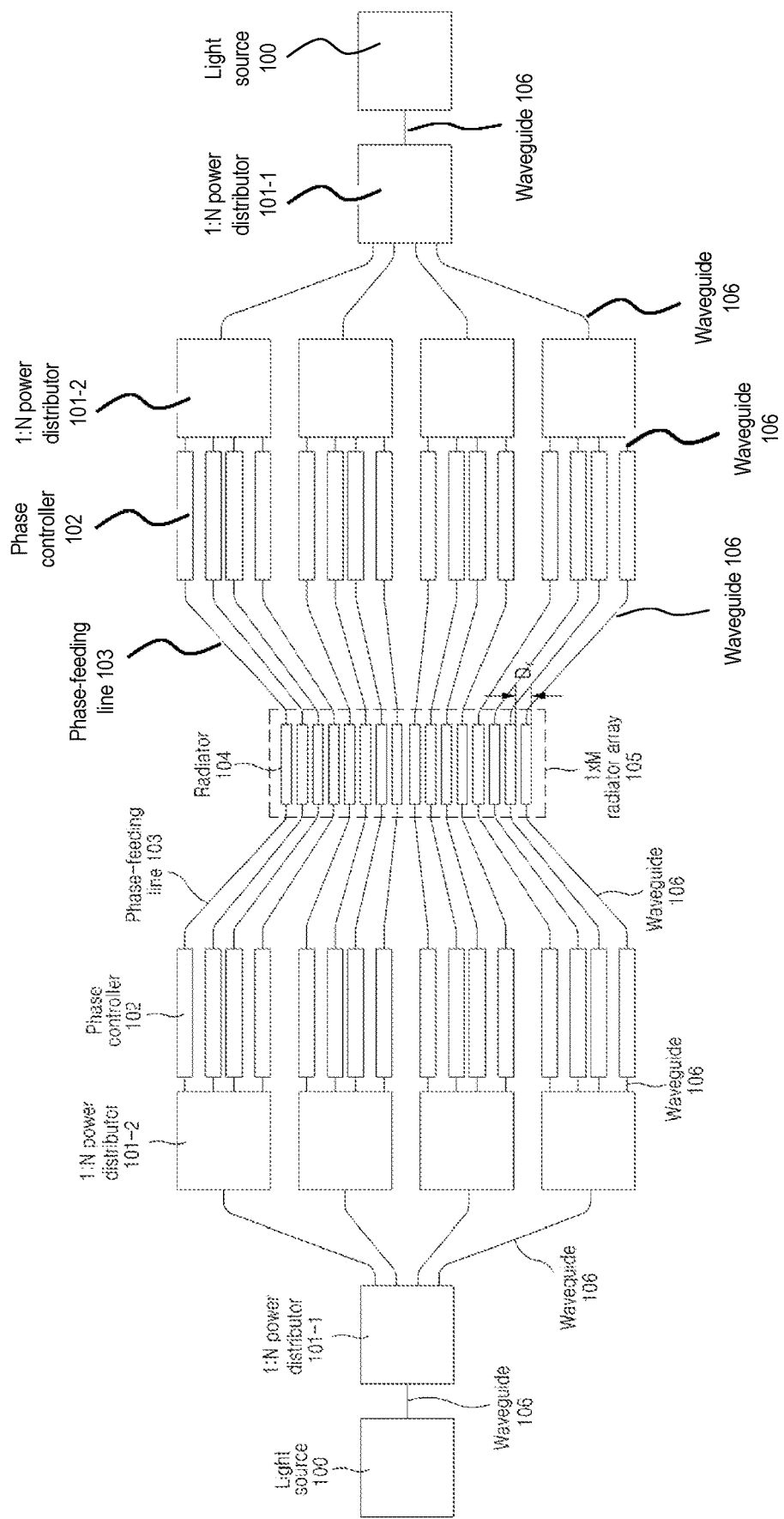
FIG. 10 is a schematic diagram illustrating major elements of a photonic phased array antenna proposed by a forgoing invention.

Referring to FIG. 9, if a grating 901 is designed to set a radiation angle of an output light wave 903-1 to $+\theta_1$ in the case that an input light wave 902-1 is incident in a direction from the left to the right, an output light wave 902-2 may be radiated to the opposite side to have a radiation angle of $-\theta_2$ in the case that another input light wave 902-2 is incident from the right to the left. Accordingly, since the radiation angles can be set to the two angles of $+\theta_1$ and $-\theta_2$ by making the input light waves 902-1 and 902-2 incident in bilateral directions, it is possible to extend a longitudinal radiation range. A configuration of a phased array antenna allowing bilateral light incidence may be simply implemented by arranging devices, which form the unilateral incident phased array antenna of FIG. 1, in a form of symmetrical mirror. In detail, the elements, such as the light source 100, the power distributers 101-1 and 101-2, the phase controller 102, the phase-feeding lines 103, and the photonic radiator 104, are also arranged at the right side in a form of symmetrical mirror, and the right phase-feeding lines are connected to the right side of the radiator, as illustrated in FIG. 10.

While the embodiments described above in conjunction with FIGS. 3A to 8E are exemplified such that a wavelength of a free space is 1,550 nm for a silicon light waveguide core, the embodiments may not be restricted thereto. A material of the light waveguide core may be made of various materials having refractive indexes close to that of silicon and the aforementioned scaling mechanism may be applied by setting a wavelength of a free space to a proper wavelength domain. For example, it is possible to apply the aforementioned trend in a wavelength ranged in 1,100 nm<$\lambda_0$<2,000 nm in a silicon light waveguide. A width of the grating, $W_g$, which is a major parameter for the grating-structured photonic radiator, may be applicable with the aforementioned trend in a range $0.3\lambda_0<W_g<5\lambda_0$.

While the embodiments described above are exemplified with a grating structure which is uniform in a grating, it is permissible to differently vary one or more parameters among the parameters of the grating structure, that is, $\Lambda g$, $\Lambda v$, $H s$, $W g$, and so on, in a lengthwise direction of the grating. Additionally, while the embodiments described above are exemplified with the case that a light wave having a single waveform is incident thereon, a light wave whose center wavelength is one or more or covers a wide range may be incident thereon.

Reference marks used for the aforementioned embodiments mean as follows.

X: longitudinal direction of grating
Z: transverse direction of grating
Y: normal direction of grating
$D_r$: transverse pitch between unit radiators
$\lambda_0$: wavelength of input light wave in free space
$\Lambda_g$: period of grating
$\Lambda_v$: valley width of unit grating
$\Lambda_h$: hill width of unit grating
$L_g$: length of grating
$N_g$: the number of periods of grating
$H_c$: thickness of waveguide core of grating
$H_s$: valley depth of grating
$W_g$: width of grating in light waveguide core
M: the number of radiators in array
$n_{eff}$: effective refractive index of light waveguide where grating is formed
$n_c$: refractive index of clad covering light waveguide where grating is formed
θ: longitudinal radiation angle of unit grating (angle from normal line)
$\phi_r$: angle representing radiation range of far-field of unit grating (latitude in a hemispherical coordinate system)
$\phi$: transverse angle where phase-matched beam is formed in phased array
$\phi_s$: the maximum longitudinal steering angle of phase-matched beam obtainable by phase control in phased array
$\Delta\phi$: phase difference between unit radiators
$2\eta_{//}$: transverse radiation angle of phase-matched beam in phased array
$2\eta_\perp$: longitudinal radiation angle of phase-matched beam in phased array

INDUSTRIAL APPLICABILITY

While embodiments of the present disclosure have been shown and described with reference to the accompanying drawings thereof, it will be understood by those skilled in the art that various changes and modifications in form and details may be made therein without departing from the spirit and scope of the present disclosure as defined by the appended claims and their equivalents. For example, it may be allowable to achieve desired results although the embodiments of the present disclosure are performed in other sequences different from the descriptions, and/or the elements, such as system, structure, device, circuit, and so on, are combined or assembled in other ways different from the descriptions, replaced or substituted with other elements or their equivalents.

Therefore, other implementations, other embodiments, and equivalents of the appended claims may be included in the scope of the appended claims.

The invention claimed is:

1. A photonic radiator device forming a photonic phased array antenna, the photonic radiator device comprising:
a left-hand-side plurality of light waveguides including a waveguide clad and a waveguide core comprised of a semiconductor material;
a right-hand-side plurality of light waveguides including a waveguide clad and a waveguide core comprised of a semiconductor material;
a radiator coupled to both the left-hand-side and right-hand-side plurality of light waveguides; and
a grating periodically formed in at least one of an upper or a lower part of each of the left-hand-side and right-hand-side plurality of light waveguides,
wherein the photonic radiator device is configured to receive an input light wave in bilateral directions of the grating from the plurality of light waveguides, for widening a range of a longitudinal angle in that the output light wave is radiated, and to radiate the output light wave to the space by using scattering from the grating.

2. The photonic radiator device of claim 1, wherein at least one dimension of geometric parameters of the photonic radiator device has a value in a diffraction limit that is a half of a wavelength of the input light wave, or has a value close to the diffraction limit by a range that is set in advance, said at least one dimension including at least one of a width of the waveguide core, a thickness of the waveguide core, a width of the grating, a period of the grating, or a depth of the grating.

3. The photonic radiator device of claim 2, wherein the waveguide core is formed of silicon.

4. The photonic radiator device of claim 2, wherein a free space wavelength $\lambda_0$ of the input light wave is within a range of 1 μm<$\lambda_0$<2 μm.

5. The photonic radiator device of claim 2, wherein the width $W_g$ of the grating is within a range of $0.3\lambda_0 \leq W_g \leq 5\lambda_0$ with respect to a free space wavelength $\lambda_0$ of the input light wave.

6. The photonic radiator device of claim 2, wherein the depth of the grating is adjusted to control a longitudinal distribution of the output light wave.

7. The photonic radiator device of claim 2, wherein the period of the grating is adjusted to control a longitudinal radiation angle of the output light wave.

8. The photonic radiator device of claim 2, wherein the width of the grating is adjusted to control a range of a transverse radiation angle in that the output light wave is radiated.

9. A method of radiating light using a photonic radiator device, the method comprising:
receiving an input light wave in bilateral directions through the photonic radiator device, wherein the photonic radiator device comprises:
a left-hand-side plurality of light waveguides including a waveguide clad and a waveguide core comprised of a semiconductor material;
a right-hand-side plurality of light waveguides including a waveguide clad and a waveguide core comprised of a semiconductor material;
a radiator coupled to both the left-hand-side and right-hand-side plurality of light waveguides;
a grating periodically formed in at least one of an upper or a lower part of the light waveguide,
wherein the photonic radiator device is configured to receive the input light wave in bilateral directions of the grating from the plurality of light waveguides and for widening a range of a longitudinal angle in that an output light wave is radiated; and radiating the output light wave to a space using scattering from the grating.

\* \* \* \* \*